United States Patent
Zhang et al.

(10) Patent No.: US 10,522,164 B2
(45) Date of Patent: Dec. 31, 2019

(54) METHOD AND DEVICE FOR IMPROVING AUDIO PROCESSING PERFORMANCE

(71) Applicant: TENCENT TECHNOLOGY (SHENZHEN) COMPANY LIMITED, Shenzhen, Guangdong (CN)

(72) Inventors: Dingyuan Zhang, Guangdong (CN); Junming Li, Guangdong (CN); Yuanjiang Peng, Guangdong (CN); Guangfa Li, Guangdong (CN); Yongchun Tang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/664,857

(22) Filed: Jul. 31, 2017

(65) Prior Publication Data
US 2017/0330579 A1 Nov. 16, 2017

Related U.S. Application Data

(63) Continuation of application No. PCT/CN2016/078463, filed on Apr. 5, 2016.

(30) Foreign Application Priority Data

May 12, 2015 (CN) .......................... 2015 1 0239444

(51) Int. Cl.
*G10L 21/00* (2013.01)
*G10L 21/02* (2013.01)
(Continued)

(52) U.S. Cl.
CPC ...... *G10L 21/0205* (2013.01); *G10L 21/0232* (2013.01); *G10L 21/0364* (2013.01);
(Continued)

(58) Field of Classification Search
CPC ..... G10L 21/02; G10L 21/0208; G10L 25/60; H04M 3/2236; H04M 3/002; H04M 9/082
(Continued)

(56) References Cited

U.S. PATENT DOCUMENTS 8,326,620 B2 * 12/2012 Hetherington .......... G10L 25/84
                                                      704/228
8,442,478 B2 *  5/2013 Ji ...................... H04M 1/72519
                                                      379/388.02
(Continued)

FOREIGN PATENT DOCUMENTS

CN    102089815 A    6/2011
CN    102196077 A    9/2011
(Continued)

OTHER PUBLICATIONS

Kang, "System and Method for Improving Quality of Call", priority date May 28, 2015, English Translation of application KR 10-2015-0074900, (KR 20160139649), pp. 1-17.*
(Continued)

*Primary Examiner* — Olujimi A Adesanya
(74) *Attorney, Agent, or Firm* — Brinks Gilson & Lione

(57) ABSTRACT

A method and a device for improving audio processing performance are provided. In some embodiments, the method includes: acquiring audio data in an audio call in a terminal; processing the audio data by utilizing an audio processing algorithm, to obtain a characteristic parameter of the audio data; analyzing the processing quality of the audio data according to the characteristic parameter of the audio data; and if the processing quality of the audio data does not reach a preset quality standard, optimizing the audio processing algorithm by utilizing optimization data matching the terminal.

17 Claims, 6 Drawing Sheets

(51) Int. Cl.
   *G10L 21/0232* (2013.01)
   *G10L 21/0364* (2013.01)
   *G10L 25/60* (2013.01)
   *H04M 3/00* (2006.01)
   *G10L 21/0208* (2013.01)

(52) U.S. Cl.
   CPC ............. *G10L 25/60* (2013.01); *H04M 3/002* (2013.01); *G10L 2021/02082* (2013.01)

(58) Field of Classification Search
   USPC .................................................. 704/225, 226
   See application file for complete search history.

(56) References Cited

U.S. PATENT DOCUMENTS

| | | | | |
|---|---|---|---|---|
| 8,965,005 | B1* | 2/2015 | Gopalakrishnan | H04M 1/19 381/94.1 |
| 9,077,814 | B2* | 7/2015 | Lee | H04M 1/72569 |
| 9,343,073 | B1* | 5/2016 | Murgia | H04M 9/082 |
| 2006/0136203 | A1* | 6/2006 | Ichikawa | G10L 21/0208 704/226 |
| 2006/0221942 | A1* | 10/2006 | Fruth | H04M 3/2236 370/356 |
| 2006/0282264 | A1* | 12/2006 | Denny | G10L 21/0208 704/233 |
| 2007/0237271 | A1* | 10/2007 | Pessoa | G10L 21/0208 375/346 |
| 2008/0225884 | A1* | 9/2008 | Crandall | H04M 1/60 370/464 |
| 2009/0012786 | A1* | 1/2009 | Zhang | G10L 21/0208 704/233 |
| 2012/0123775 | A1* | 5/2012 | Murgia | G10L 21/0205 704/228 |
| 2012/0169828 | A1 | 7/2012 | Lee | |
| 2013/0246056 | A1* | 9/2013 | Sugiyama | G10L 21/02 704/205 |
| 2016/0005422 | A1* | 1/2016 | Zad Issa | G10L 25/84 704/226 |
| 2018/0069958 | A1* | 3/2018 | Kang | H04M 3/002 |

FOREIGN PATENT DOCUMENTS

| | | |
|---|---|---|
| CN | 104217728 A | 12/2014 |
| CN | 104299622 A | 1/2015 |
| CN | 104378774 A | 2/2015 |
| CN | 104750494 A | 7/2015 |
| CN | 104980337 A | 10/2015 |

OTHER PUBLICATIONS

International Search Report received in international Application No. PCT/CN2016/078463 dated Jun. 21, 2016 dated Jul. 11, 2016 in 2 pages.

Office Action dated May 5, 2019 for Chinese Application No. 201510239444.5 with concise English Translation, 9 pages.

* cited by examiner

METHOD AND DEVICE FOR IMPROVING AUDIO PROCESSING PERFORMANCE

This application is a continuation of International Patent Application No. PCT/CN2016/078463 filed on Apr. 5, 2016, which claims the priority to Chinese Patent Application No. 201510239444.5 titled "METHOD AND DEVICE FOR IMPROVING AUDIO PROCESSING PERFORMANCE" and filed with the State Intellectual Property Office of the People's Republic of China on May 12, 2015, both of which are incorporated herein by reference in their entireties.

TECHNICAL FIELD

The disclosure relates to the field of Internet technologies, specifically, to the field of audio technologies, and in particular, to a method and a device for improving audio processing performance.

BACKGROUND

With the development of Internet technologies, the Internet applications have also been developed rapidly. The Internet applications may include but are not limited to instant messaging applications, SNS (Social Networking Services) applications, voice communication applications, etc. The Internet applications described above may be installed in terminal such as note-book computers, mobile phones, PAD (tablet computers). An end-user may use an Internet application in the terminal to make an audio call such as a voice call, an audio chat with another user. The audio quality is an important factor for the audio calls. Therefore how to improve the audio quality of audio calls is an issue to be settled.

SUMMARY

In embodiments of the disclosure, a method and a device for improving audio processing performance are provided, with which an audio processing is performed on audio data of an audio call so as to improve the audio quality, and the audio processing quality is analyzed and optimized so as to improve the quality of audio processing and ensure the effect of the audio quality.

In a first aspect of the embodiments of the present disclosure, a method for improving audio processing performance is provided, which may include:

acquiring audio data of an audio call in a terminal;

processing the audio data by utilizing an audio processing algorithm, and obtaining a characteristic parameter of the audio data;

analyzing a processing quality of the audio data based on the characteristic parameter of the audio data; and optimizing the audio processing algorithm by utilizing optimization data matching the terminal if the processing quality of the audio data does not reach a preset quality standard.

In a second aspect of the embodiments of the present disclosure, a device for improving audio processing performance is provided, which may include:

an acquisition unit, configured to acquire audio data of an audio call in a terminal;

an audio processing unit, configured to process the audio data by utilizing an audio processing algorithm, and obtain a characteristic parameter of the audio data;

an analysis unit, configured to analyze a processing quality of the audio data based on the characteristic parameter of the audio data; and an optimization unit, configured to optimize the audio processing algorithm by utilizing optimization data matching the terminal if the processing quality of the audio data does not reach a preset quality standard.

The embodiments of the disclosure have the following advantageous effects.

In the embodiments of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the audio quality.

BRIEF DESCRIPTION OF THE DRAWINGS

The accompany drawings used in the description of the embodiments or the conventional technology will be described briefly as follows, so that the technical solutions according to the embodiments of the present disclosure or the conventional technology will become more apparent. It is clear that the accompany drawings in the following description only illustrate some embodiments of the present disclosure. For those skilled in the art, other accompany drawings may be obtained according to these accompany drawings without any creative work.

DETAILED DESCRIPTION OF THE EMBODIMENTS

The technical solutions according to the embodiments of the present disclosure will be described in details in conjunction with the drawings. It is clear that the disclosed embodiments are a few of the embodiments of the present disclosure, rather than all of the embodiments. Other embodiments obtained by those skilled in the art based on the embodiments of the disclosure without creative work, fall into the scope of the disclosure.

In the embodiments of the disclosure, a terminal may be a PC (Personal Computer), a note-book computer, a mobile phone, a PAD (a tablet computer), a vehicle terminal, an intelligent wearable device, etc. Internet applications may be installed in the terminal. The Internet applications may include but are not limited to an instant messaging application, a SNS (Social Networking Services) application, a voice communication application, etc. An end-users may use an Internet application in the terminal to make an audio call with another user.

A method for improving audio processing performance according to the embodiments of the present disclosure will be described in details in conjunction with FIG. 1 and FIG. 2. It should be noted that, the flow of the method in FIG. 1 to FIG. 2 may be executed by the device for improving audio processing performance according to the embodiments of the disclosure, and the device may operate in a terminal or in a server, or operate in a terminal and a server in a distributed manner.

Figure 1:
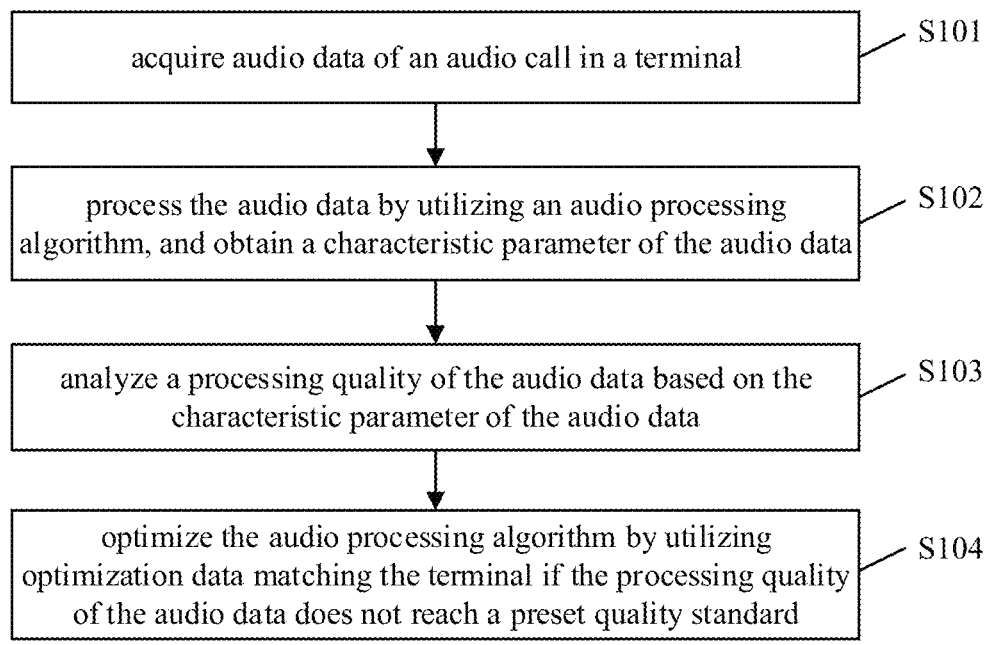
FIG. 1 is a flowchart of a method for improving audio processing performance according to an embodiment of the present disclosure.

Reference is made to FIG. 1, which is a flowchart of a method for improving audio processing performance according to an embodiment of the present disclosure. The flow of the method according to the embodiment may be executed by the device for improving audio processing performance operating in a terminal or in a server. The method may include step S101 to step S104 as follows.

In step S101, audio data of an audio call in a terminal is acquired.

An end-user may use an Internet application in the terminal to make an audio call to another user. The audio call may include but is not limited to a voice phone call, an audio or video chat, etc. In this step, voice information in the audio is collected while the terminal is making the audio call. The voice information of the audio call may include but is not limited to voice information of a caller or voice information such as songs, audio or video which is played by a caller in a voice call, and voice information of a chatter or voice information such as songs, audio or video which is played by a chatter in an audio or video chat, etc. The voice information collected in the audio call is an analog signal. In this step, in order to facilitate the audio processing, the analog signal needs to be converted into a digital signal, i.e., converting the analog voice information collected in the audio call into digital audio data of the audio call.

In step S102, the audio data is processed by utilizing an audio processing algorithm, and a characteristic parameter of the audio data is obtained.

The audio processing algorithm may include but is not limited to at least one of an echo cancellation algorithm, a noise reduction algorithm and a volume gain algorithm. In this step, processing the audio data by utilizing an audio processing algorithm may include at least one of: performing an echo cancellation process on the audio data by utilizing the echo cancellation algorithm; performing a noise reduction process on the audio data by utilizing the noise reduction algorithm; and performing a volume gain process on the audio data by utilizing the volume gain processing algorithm.

The characteristic parameter of the audio data includes at least one of an echo parameter, a noise parameter and a gain parameter. The echo parameter includes: an echo processing duration, an echo roundtrip loss and an echo roundtrip loss enhancement; the noise parameter includes: an input signal-to-noise ratio and an output signal-to-noise ratio; and the gain parameter includes: an input digital envelope of volume and an output digital envelope of volume. The echo processing duration represents the time length of the echo cancellation process. The echo roundtrip loss can reflect the ability of the echo cancellation process. A smaller value of the echo roundtrip loss indicates a cleaner result of the echo cancellation process, i.e., a greater ability of the echo cancellation process. The echo roundtrip loss enhancement can reflect the ability of the echo cancellation process. A larger value of the echo roundtrip loss enhancement indicates a cleaner result of the echo cancellation process, i.e., a greater ability of the echo cancellation process. The input signal-to-noise ratio may provide feedback on the noise condition of the voice information collected in the audio call. A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise to an appropriate without causing a loss to a normal audio component. The input digital envelope of volume can reflect the magnitude of original volume. The original volume is volume of the voice information collected in the audio call. A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume.

In step S103, a processing quality of the audio data is analyzed based on the characteristic parameter of the audio data.

Analyzing a processing quality of the audio data based on the characteristic parameter of the audio data may include at least one of: analyzing the processing quality of the echo cancellation process based on the echo parameter of the audio data; analyzing the processing quality of the noise reduction process based on the noise parameter of the audio data; and analyzing the quality of the volume gain process based on the gain parameter.

In step S104, the audio processing algorithm is optimized by utilizing optimization data matching the terminal if the processing quality of the audio data does not reach a preset quality standard. The optimization data may include at least one of adjustment data of the echo cancellation algorithm, adjustment data of the noise reduction algorithm and adjustment data of the volume gain algorithm.

The preset quality standard may include at least one of a preset range of echo cancellation degree, a preset range of noise, and a preset range of gain volume. If the echo cancellation degree of the audio data is in the preset range of echo cancellation degree, and/or if the noise magnitude of the audio data after the noise reduction process is in the preset range of noise, and/or if the gain volume of the audio data is in the preset range of gain volume, the audio data processing quality reaches the preset quality standard.

The processing quality of the audio data can reflect merits of the audio processing algorithm. Specifically, the audio processing algorithm needs no optimization if the processing quality of audio data reaches the preset quality standard; whereas, the audio processing algorithm needs to be optimized if the processing quality of the audio data does not reach the preset quality standard. In this step, optimization data matching the terminal may be acquired to optimize the audio processing algorithm, so as to improve the quality and effect of follow-up audio processing to be performed on the audio data in the terminal.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 2:
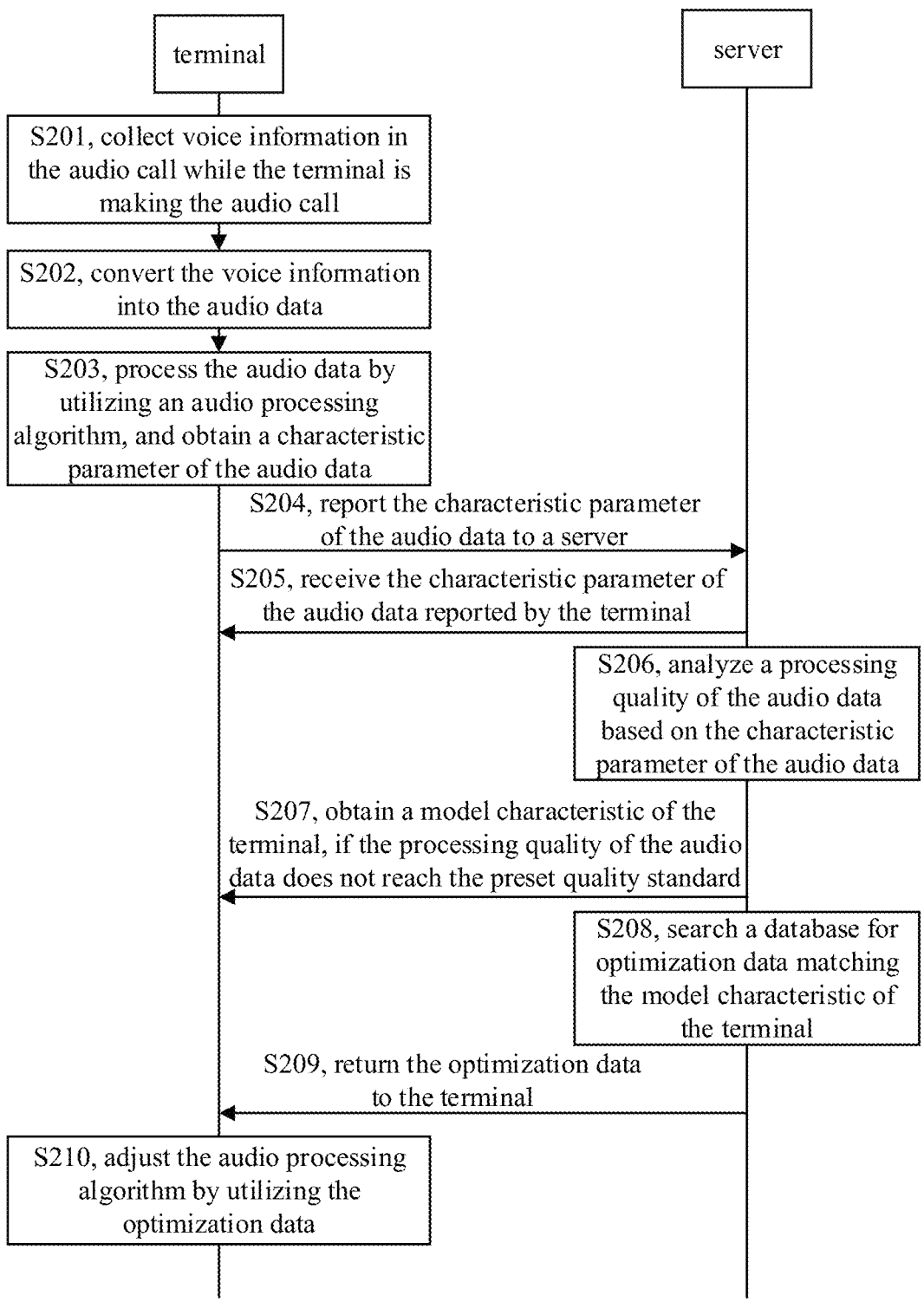
FIG. 2 is a flowchart of a method for improving audio processing performance according to another embodiment of the present disclosure.

Reference is made to FIG. 2, which is flowchart of a method for improving audio processing performance according to another embodiment of the present disclosure. The flow of the method according to the embodiment may be executed by the device for improving audio processing performance operating in a terminal and a server in a distributed manner. The device enable interactions between the terminal and the server via modules distributed in the terminal and the server, so as to achieve the method for improving audio processing performance according to the embodiment. The method may include step S201 to step S104 as follows.

In step S201, the terminal collects voice information in the audio call while the terminal is making the audio call.

An end-user may use an Internet application in the terminal to make an audio call with another user. The audio call may include but is not limited to a voice phone call, an audio or video chat, etc. In this step, while the terminal is making the audio call, the terminal may invoke a device that has an audio collecting function, such as a sound card, to collect voice information in the audio call. The voice information of the audio call may include but is not limited to voice information of a caller or voice information such as songs, audio or video which is played by a caller in a voice call, and voice information of a chatter or voice information such as songs, audio or video which is played by a chatter in an audio or video chat, etc.

In step S202, the terminal converts the voice information into the audio data.

The voice information collected in the audio call by the terminal is an analog signal. In this step, in order to facilitate the audio processing, the terminal needs to convert the analog signal into a digital signal, that is, the terminal converts the analog voice information collected in the audio call into digital audio data of the audio call.

In step S203, the terminal processes the audio data by utilizing an audio processing algorithm, and obtains a characteristic parameter of the audio data.

The audio processing algorithm includes at least one of an echo cancellation algorithm, a noise reduction algorithm and a volume gain algorithm. The characteristic parameter of the audio data includes at least one of an echo parameter, a noise parameter and a gain parameter. In this step, there exist several practicable implementations for the terminal to utilize the audio processing algorithm to process the audio data and obtain a characteristic parameter of the audio data.

In an implementation, the terminal performs the echo cancellation process by utilizing the echo cancellation algorithm; and the terminal records an echo parameter obtained during the echo cancellation process.

The echo cancellation process is aimed at eliminating or reducing the echo audible to end-users, so as to improve the quality of the audio call. The echo cancellation algorithm may include but is not limited to an LMS (Least mean square) algorithm, a NLMS (Normalized Least mean square) algorithm, etc. The kernel of the echo cancellation algorithm lies in coordinating issue of remote-end time delay or near-end time delay of audio calls between terminals. The echo parameter includes: an echo processing duration, an echo roundtrip loss and an echo roundtrip loss enhancement. The echo processing duration represents the time length of the echo cancellation process. The echo roundtrip loss can reflect the ability of the echo cancellation process. A smaller value of the echo roundtrip loss indicates a cleaner result of the echo cancellation process, i.e., a greater ability of the echo cancellation process. The echo roundtrip loss enhancement can reflect the ability of the echo cancellation process, a larger value of the echo roundtrip loss enhancement indicates a cleaner result of the echo cancellation process, i.e., a greater ability of the echo cancellation process.

In another implementation, the terminal utilizes the noise reduction algorithm to perform a noise reduction process on the audio data, and calculates a noise parameter based on the noise reduction process.

The noise reduction process is aimed at reducing the noise in the audio call, so as to improve the audio quality. The noise reduction algorithm may include but is not limited to an MATLAB (Matrix Laboratory) algorithm, an LMS (Least mean square) algorithm, etc. The kernel of the noise reduction algorithm lies in setting a noise detecting threshold. In the noise reduction process, noise is filtered based on the noise detecting threshold, that is, noise greater than the noise detection threshold is filtered out. The noise detecting threshold determines a degree of noise reduction process and a loss degree of a normal audio component. For example, if the noise detecting threshold is too small, the quality of the noise reduction process will be poor, and the effect of noise reduction will be insignificant; if the noise detecting threshold is too large, the effect of noise reduction will be improved, while the loss degree of the normal audio component will be increased. The noise parameter includes: an input signal-to-noise ratio and an output signal-to-noise ratio. In this embodiment, the terminal may calculate the input signal-to-noise ratio of the audio data before the noise reduction process, and calculate the output signal-to-noise ratio of the audio data after the noise reduction process. The input signal-to-noise ratio may provide feedback on the noise condition of the voice information collected in the audio call. A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise to an appropriate level without causing a loss to a normal audio component.

In another implementation, the terminal performs a volume gain process on the audio data by utilizing the volume gain processing algorithm, and counting a gain parameter based on the volume gain process.

The volume gain process is aimed at adjusting volume of the audio call to a normal range for the end-user to listen, so as to improve quality of the audio call. The kernel of the volume gain processing algorithm lies in setting a gain ratio, that is, a ratio of a gain volume to an original volume. The gain parameter includes: an input digital envelope of volume and an output digital envelope of volume. The input digital envelope of volume can reflect the magnitude of original volume. The original volume is volume of the voice information collected in the audio call. A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume.

In step S204, the terminal reports the characteristic parameter of the audio data to a server.

The terminal and the server may have a wired or wireless communication connection. The terminal may report the characteristic parameter of the audio data to a server through the communication connection to the server.

In step S205, the server receives the characteristic parameter of the audio data reported by the terminal. The server may receive the characteristic parameter of the audio data reported by the terminal through the communication connection to the terminal.

In step S206, the server analyzes the processing quality of the audio data based on the characteristic parameter of the audio data.

In this step, there exist several practicable implementations for the server to analyze the processing quality of the audio data based on the characteristic parameter of the audio data.

In an implementation, the server determines an echo cancellation degree of the audio data based on the echo processing duration, the echo roundtrip loss and the echo roundtrip loss enhancement.

In practice, the server may set the corresponding thresholds according to actual needs. For example, the server may set a time threshold according to experiences. If the echo processing duration is longer than the preset time threshold, it means that the time which the echo cancellation algorithm takes to perform the echo cancellation process on the audio data by the terminal is long, and thus the quality of echo cancellation process is poor. For another example, the server may set a loss threshold according to experiences. If the echo roundtrip loss value is greater than the preset loss threshold, it means that echo cancellation of the audio data, which is performed by the terminal using the echo cancellation algorithm, is not clean enough, and thus the quality of echo cancellation process is poor. For another example, the server may set a loss enhancement threshold according to experiences. If the echo roundtrip loss enhancement value is smaller than the preset loss enhancement threshold, it means that echo cancellation of the audio data, which is performed by the terminal using the echo cancellation algorithm, is not clean enough, and thus the quality of echo cancellation process is poor.

In another implementation, the server determines a noise magnitude of the audio data before the noise reduction process based on the input signal-to-noise ratio, and determines a noise magnitude of the audio data after the noise reduction process based on the output signal-to-noise ratio.

A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise reduce to an appropriate without causing a loss to a normal audio component. In this implementation, the server may set expected status value according to experiences. If the input signal-to-noise ratio value indicates that noise of the voice information collected in the audio call is large, and if the output signal-to-noise ratio value is less than the expected status value, it shows that the effect of noise reduction process does not reach the expected status, and the quality of the noise reduction process is poor.

In another implementation, the server determines an original volume of the audio data based on the input digital envelope of volume, and determines a gain volume of the audio data based on the output digital envelope of volume.

The input digital envelope of volume can reflect the magnitude of original volume. The original volume is volume of the voice information collected in the audio call. A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume. In this implementation, the server may set a user listening volume range according to experiences. If the value of the output digital envelop of volume is beyond the user listening volume range, it shows that the effect and quality of the volume gain process is poor.

In step S207, a model characteristic of the terminal is obtained, if the processing quality of the audio data does not reach the preset quality standard.

The preset quality standard may include at least one of a preset range of echo cancellation degree, a preset range of noise, and a preset range of gain volume. If the echo cancellation degree of the audio data is in the preset range of echo cancellation degree, and/or if the noise magnitude of the audio data after the noise reduction process is in the preset range of noise, and/or if the gain volume of the audio data is in the preset range of gain volume, the audio data processing quality reaches the preset quality standard. The model characteristic of the terminal may include but is not limited to any one or more kinds of model information of the terminal, Rom information of the terminal, vendor information of the terminal, core information of the terminal and sound card information of the terminal. In this step, the server acquires the model characteristic of the terminal from the terminal. Specifically, the server may require the terminal to report the model characteristic, and the terminal extracts the model characteristic thereof according to the requirement of the server, and reports to the server.

In step S208, the server searches a database for optimization data matching the model characteristic of the terminal.

The database may store in advance at least one kind of the terminal model characteristic, as well as optimization data corresponding to the model characteristic of each terminal. The optimization data may include at least one of adjustment data of the echo cancellation algorithm, adjustment data of the noise reduction algorithm and adjustment data of the volume gain algorithm. The adjustment data of the echo cancellation algorithm may be a remote-end or near-end time delay, the adjustment data of the noise reduction algorithm may be a noise detecting threshold, the adjustment data of the volume gain processing algorithm may be a gain ratio. In this step, the server may search a database for optimization data matching the model characteristic of the terminal.

In step S209, the server returns the optimization data to the terminal. The server may return the optimization data to the terminal through the communication connection to the terminal.

In step S210, the terminal adjusts the audio processing algorithm by utilizing the optimization data.

In practice, the terminal utilizes the adjustment data of the echo cancellation algorithm to optimize the echo cancellation algorithm, if the echo cancellation algorithm needs to be optimized; the terminal utilizes the adjustment data of the noise reduction algorithm to optimize the noise reduction algorithm, if the noise reduction algorithm need to be optimized; and the terminal utilizes the adjustment data of the volume gain algorithm to optimize the volume gain algorithm, if the volume gain algorithm need to be optimized It should be noted that, the adjustment process of the audio processing algorithm performed by the terminal may be as follows: the corresponding data of the original audio processing algorithm is replaced by the adjustment data directly; or, the corresponding data of the original audio processing algorithm is adjusted based on the adjustment data. The adjustment process of the terminal may include the follows.

(1) In general, the problem of remote-end time delay or near-end time delay between the terminals making the audio call, will affect the echo cancellation process quality of the echo cancellation algorithm. The terminal may adjust the remote-end time delay or near-end time delay of the audio data in the audio calls to optimize the echo cancellation algorithm.

(2) In general, the kernel of noise reduction algorithm is the noise detecting threshold. Noise is filtered by the noise reduction process based on the noise detecting threshold. The noise detecting threshold determines a degree of noise reduction process and a loss degree of a normal audio component. For example, if the noise detecting threshold is too small, the quality of the noise reduction process will be poor, and the effect of noise reduction will be insignificant; if the noise detecting threshold is too large, the effect of noise reduction will be improved, while the loss degree of the normal audio component will be increased. The terminal may adjust the noise detecting threshold to optimize the noise reduction algorithm.

(3) In general, the kernel of the volume gain algorithm lies in a gain ratio, that is, a ratio of a gain volume to an original volume. The terminal may adjust the gain ratio to optimize the volume gain algorithm.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Structure and functions of a device for improving audio processing performance according to the embodiments of the present disclosure will be described in details in conjunction with FIG. 3 to FIG. 7. It should be noted that, the device as shown in FIG. 3 to FIG. 7 may operate in a terminal, in a server, or operate in a terminal and a server in a distributed manner, so as to execute the above method as shown in FIG. 1 to FIG. 2.

Figure 3:
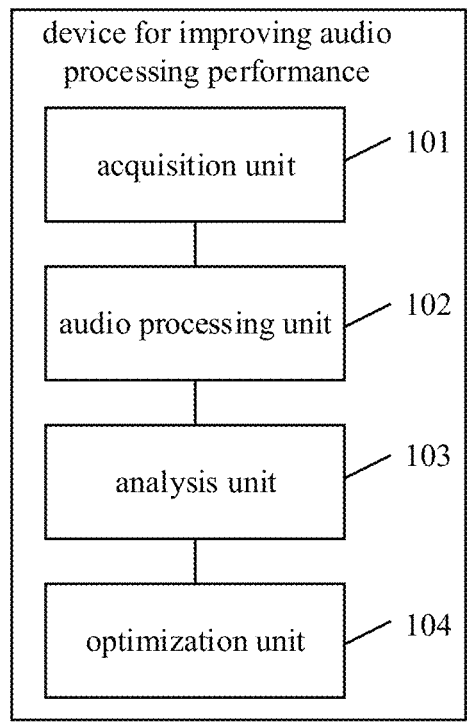
FIG. 3 is a schematic structure diagram of a device for improving audio processing performance according to an embodiment of the present disclosure.

Reference is made to FIG. 3, which is a schematic structure diagram of a device for improving audio processing performance according to an embodiment of the present disclosure. The device may include an acquisition unit 101, an audio processing unit 102, an analysis unit 103 and an optimization unit 104.

The acquisition unit 101 is configured to acquire audio data in an audio call in a terminal.

An end-user may use an Internet application in the terminal to make an audio call with another user, the audio call may include but is not limited to a voice phone call, an audio or video chat, etc. The acquisition unit 101 may collect voice information in the audio call, while the terminal is making the audio call. The voice information of the audio call may include but is not limited to voice information of a caller or voice information such as songs, audio or video which is played by a caller in a voice call, and voice information of a chatter or voice information such as songs, audio or video which is played by a chatter in an audio or video chat, etc. The voice information collected in the audio call is an analog signal. In order to facilitate the audio processing, the acquisition unit 101 needs to convert the analog signal into a digital signal, i.e., converting the analog voice information collected in the audio call into digital audio data of the audio call.

The audio processing unit 102 is configured to process the audio data by utilizing an audio processing algorithm, and obtain a characteristic parameter of the audio data.

The audio processing algorithm may include but is not limited to at least one of an echo cancellation algorithm, a noise reduction algorithm and a volume gain algorithm. Processing the audio data by utilizing an audio processing algorithm via the audio processing unit 102 may include at least one of: performing an echo cancellation process on the audio data by utilizing the echo cancellation algorithm; performing a noise reduction process on the audio data by utilizing the noise reduction algorithm; and performing a volume gain process on the audio data by utilizing the volume gain processing algorithm.

The characteristic parameter of the audio data includes at least one of an echo parameter, a noise parameter and a gain parameter. The echo parameter includes: an echo processing duration, an echo roundtrip loss and an echo roundtrip loss enhancement; the noise parameter includes: an input signal-to-noise ratio and an output signal-to-noise ratio; and the gain parameter includes: an input digital envelope of volume and an output digital envelope of volume. The echo processing duration represents the time length of the echo cancellation process. The echo roundtrip loss can reflect the ability of the echo cancellation process. A smaller value of the echo roundtrip loss indicates a cleaner result of the echo cancellation process, i.e., a greater ability of the echo cancellation process. The echo roundtrip loss enhancement can reflect the ability of the echo cancellation process. A larger value of the echo roundtrip loss enhancement indicates a cleaner result of the echo cancellation process, i.e., a greater ability of the echo cancellation process. The input signal-to-noise ratio may provide feedback on the noise condition of the voice information collected in the audio call. A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise to an appropriate level without causing a loss to a normal audio component. The input digital envelope of volume can reflect the magnitude of original volume. The original volume is volume of the voice information collected in the audio call.

A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume.

The analysis unit 103 is configured to analyze a processing quality of the audio data based on the characteristic parameter of the audio data.

Analyzing a processing quality of the audio data based on the characteristic parameter of the audio data may include at least one of: analyzing the quality of the echo cancellation process based on the echo parameter of the audio data; analyzing the processing quality of the noise reduction process based on the noise parameter of the audio data; and analyzing the quality of the volume gain process based on the gain parameter.

The optimization unit 104 is configured to optimize the audio processing algorithm by utilizing optimization data matching the terminal if the processing quality of the audio data does not reach a preset quality standard.

The optimization data may include at least one of adjustment data of the echo cancellation algorithm, adjustment data of the noise reduction algorithm and adjustment data of the volume gain algorithm. The preset quality standard may include at least one of a preset range of echo cancellation degree, a preset range of noise, and a preset range of gain volume. If the echo cancellation degree of the audio data is in the preset range of echo cancellation degree, and/or if the noise magnitude of the audio data after the noise reduction process is in the preset range of noise, and/or if the gain volume of the audio data is in the preset range of gain volume, the audio data processing quality reaches the preset quality standard.

The processing quality of the audio data can reflect merits of the audio processing algorithm. Specifically, the audio processing algorithm needs no optimization if the processing quality of audio data reaches the preset quality standard; whereas, the audio processing algorithm needs to be optimized if the processing quality of the audio data does not reach the preset quality standard. The optimization unit 104 may acquire optimization data matching the terminal to optimize the audio processing algorithm, so as to improve the quality and effect of follow-up audio processing to be performed on the audio data in the terminal.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 4:
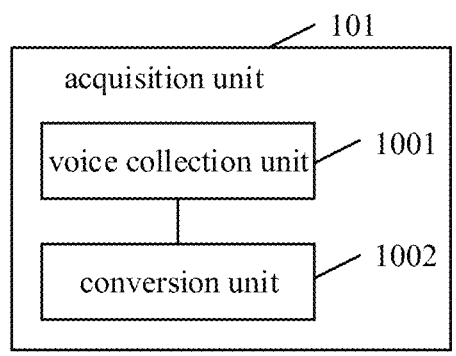
FIG. 4 is a schematic structure diagram of an embodiment of an acquisition unit as shown in FIG. 3.

Reference is made to FIG. 4, which is a schematic structure diagram of an embodiment of an acquisition unit as shown in FIG. 3; the acquisition unit 101 may include: a voice collection unit 1001 and a converting unit 1002.

The voice collection unit 1001 is configured to collect voice information in the audio call while the terminal is making the audio call.

An end-user may use an Internet application in the terminal to make an audio call with another user, the audio call may include but is not limited to a voice phone call, an audio or video chat, etc. While the terminal is making the audio call, the voice collection unit 1001 may invoke a device of the terminal that has an audio collecting function, such as a sound card, to collect voice information in the audio call. The voice information of the audio call may include but is not limited to voice information of a caller or voice information such as songs, audio or video which is played by a caller in a voice call, and voice information of a chatter or voice information such as songs, audio or video which is played by a chatter in an audio or video chat, etc.

The conversion unit 1002 is configured to convert the voice information into the audio data.

The voice information collected in the audio call is an analog signal. In order to facilitate the audio processing, the conversion unit 1002 needs to convert the analog signal into a digital signal, that is, the terminal converts the analog voice information collected in the audio call into digital audio data of the audio call.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 5A:
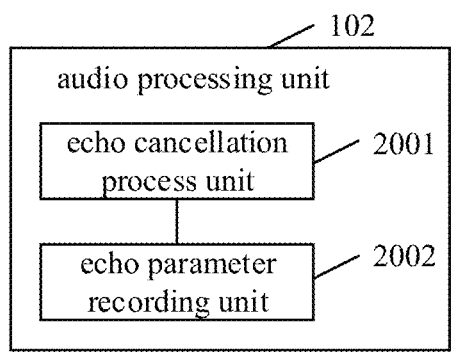
FIG. 5a is a schematic structure diagram of an embodiment of an audio processing unit as shown in FIG. 3.

Reference is made to FIG. 5*a*, which is a schematic structure diagram of an embodiment of an audio processing unit as shown in FIG. 3. The audio processing unit 102 may include: an echo cancellation process unit 2001 and an echo parameter recording unit 2002.

The echo cancellation process unit 2001 is configured to perform the echo cancellation process by utilizing the echo cancellation algorithm.

The echo cancellation process is aimed at eliminate or reduce the echo audible to end-users, so as to improve the quality of the audio call. The echo cancellation algorithm may include but is not limited to an LMS algorithm and an NLMS algorithm, etc. The kernel of the echo cancellation algorithm lies in coordinating issue of remote-end time delay or near-end time delay of audio calls between terminals.

The echo parameter recording unit 2002 is configured to record an echo parameter obtained during the echo cancellation process.

The echo parameter includes: an echo processing duration, an echo roundtrip loss and an echo roundtrip loss enhancement. The echo processing duration represents the time length of the echo cancellation process. The echo roundtrip loss can reflect the ability of the echo cancellation process. A smaller value of the echo roundtrip loss indicates a cleaner result of the echo cancellation process, i.e., a greater ability of the echo cancellation process. The echo roundtrip loss enhancement can reflect the ability of the echo cancellation process. A larger value of the echo roundtrip loss enhancement indicates a cleaner result of the echo cancellation process, i.e., a greater ability of the echo cancellation process.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 5B:
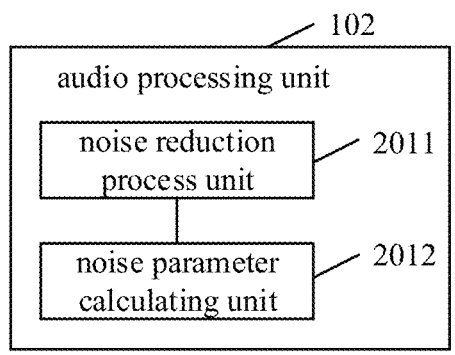
FIG. 5b is a schematic structure diagram of another embodiment of an audio processing unit as shown in FIG. 3.

Reference is made to FIG. 5b, which is a schematic structure diagram of another embodiment of an audio processing unit as shown in FIG. 3. The audio processing unit 102 may include: a noise reduction process unit 2011 and a noise parameter calculating unit 2012.

The noise reduction process unit 2011 is configured to perform a noise reduction process on the audio data by utilizing the noise reduction algorithm.

The noise reduction process is aimed at reducing the noise in the audio call, so as to improve the audio quality. The noise reduction algorithm may include but is not limited to an MATLAB algorithm, an LMS algorithm, etc. The kernel of the noise reduction algorithm lies in setting a noise detecting threshold. In the noise reduction process, noise is filtered based on the noise detecting threshold, that is, noise greater than the noise detection threshold is filtered out. The noise detecting threshold determines a degree of noise reduction process and a loss degree of a normal audio component. For example, if the noise detecting threshold is too small, the quality of the noise reduction process will be poor, and the effect of noise reduction will be insignificant; if the noise detecting threshold is too large, the effect of noise reduction will be improved, while the loss degree of the normal audio component will be increased.

The noise parameter calculating unit 2012 is configured to calculate a noise parameter based on the noise reduction process.

The noise parameter includes: an input signal-to-noise ratio and an output signal-to-noise ratio. In this embodiment, the terminal may calculate the input signal-to-noise ratio of the audio data before the noise reduction process, and calculate the output signal-to-noise ratio of the audio data after the noise reduction process. The input signal-to-noise ratio may provide feedback on the noise condition of the voice information collected in the audio call. A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise to an appropriate without causing a loss to a normal audio component.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 5C:
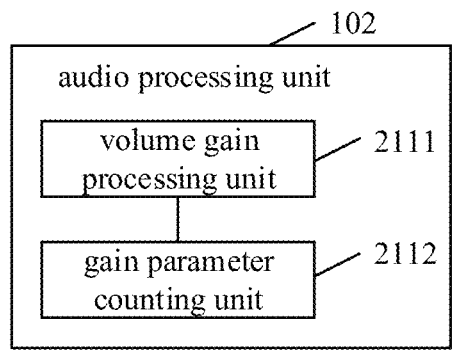
FIG. 5c is a schematic structure diagram of another embodiment of an audio processing unit as shown in FIG. 3.

Reference is made to FIG. 5c, which is a schematic structure diagram of another embodiment of an audio processing unit as shown in FIG. 3. The audio processing unit 102 may include: a volume gain processing unit 2111 and a gain parameter counting unit 2112.

The volume gain processing unit 2111 is configured to perform a volume gain process on the audio data by utilizing the volume gain processing algorithm.

The volume gain process is aimed at adjusting volume of the audio call to a normal range for the end-user to listen, so as to improve quality of the audio call. The kernel of the volume gain processing algorithm lies in setting a gain ratio, that is, a ratio of a gain volume to an original volume.

The gain parameter counting unit 2112 is configured to count a gain parameter based on the volume gain process.

The gain parameter includes: an input digital envelope of volume and an output digital envelope of volume. The input digital envelope of volume can reflect the magnitude of original volume. The original volume is volume of the voice information collected in the audio call. A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 6:
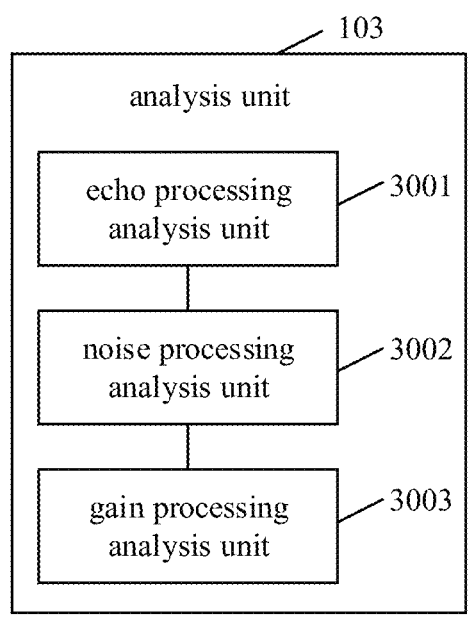
FIG. 6 is a schematic structure diagram of an embodiment of an analysis unit as shown in FIG. 3.

Reference is made to FIG. 6, which is a schematic structure diagram of an embodiment of an analysis unit as shown in FIG. 3. The analysis unit 103 may include: an echo processing analysis unit 3001 and/or a noise processing analysis unit 3002 and/or a gain processing analysis unit 3003.

The echo processing analysis unit 3001 is configured to determine an echo cancellation degree of the audio data based on the echo processing duration, the echo roundtrip loss and the echo roundtrip loss enhancement.

In practice, the echo processing analysis unit 3001 may set the corresponding thresholds according to actual needs. For example, a time threshold may be set according to experiences. If the echo processing duration is longer than the preset time threshold, it means that the time which the echo cancellation algorithm takes to perform the echo cancellation process on the audio data is long, and the quality of echo cancellation process is poor. For another example, a loss threshold may be set according to experiences. If the echo roundtrip loss value is greater than the preset loss threshold, it means that echo cancellation of the audio data, which is performed by utilizing the echo cancellation algorithm, is not clean enough, and the quality of echo cancellation process is poor. For another example, a loss enhancement threshold may be set according to experiences. If the echo roundtrip loss enhancement value is smaller than the preset loss enhancement threshold, it means that echo cancellation of the audio data, which is performed by utilizing the echo cancellation algorithm, is not clean enough, and the quality of echo cancellation process is poor.

The noise processing analysis unit 3002 is configured to determine a noise magnitude of the audio data before the noise reduction process based on the input signal-to-noise ratio, and determine a noise magnitude of the audio data after the noise reduction process based on the output signal-to-noise ratio.

A larger input signal-to-noise ratio indicates a larger noise of the voice information collected in the audio call. The output signal-to-noise ratio can reflect the effect of the noise reduction process. If the output signal-to-noise ratio value reaches an expected status value, it shows that the effect of noise reduction process reaches an expected status, that is, the noise reduction process reduces the noise to an appropriate level without causing a loss to a normal audio component. In this embodiment, the noise processing analysis unit 3002 may set expected status value according to experiences. If the input signal-to-noise ratio value indicates that noise of the voice information collected in the audio call is large, and if the output signal-to-noise ratio value is less than the expected status value, it shows that the effect of noise reduction process does not reach the expected status, and the quality of the noise reduction process is poor.

The gain processing analysis unit 3003 is configured to determine an original volume of the audio data based on the input digital envelope, and determine a gain volume of the audio data based on the output digital envelope.

The input digital envelope of volume can reflect the magnitude of original volume. The original volume is volume of the voice information collected in the audio call. A larger value of the input digital envelope of volume indicates a larger original volume. The output digital envelope of volume can reflect the magnitude of gain volume. The gain volume is volume outputted after the volume gain process. A larger value of the output digital envelope of volume indicates a larger gain volume. In this embodiment, the gain processing analysis unit 3003 may set a user listening volume range according to experiences. If the value of the output digital envelop of volume is beyond the user listening volume range, it shows that the effect and quality of the volume gain process is poor.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 7:
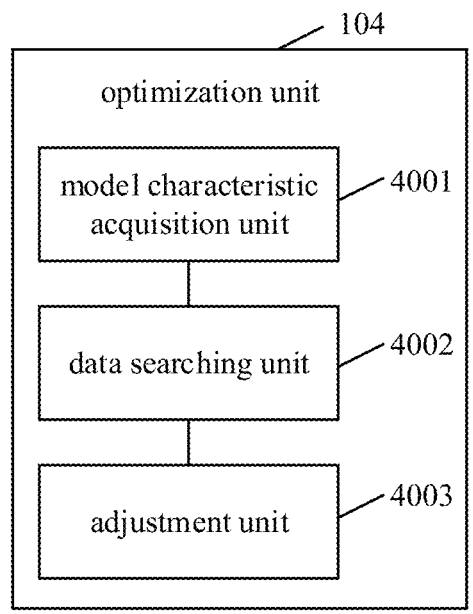
FIG. 7 is a schematic structure diagram of an embodiment of an optimization unit as shown in FIG. 3.

Reference is made to FIG. 7, which is a schematic structure diagram of an embodiment of an optimization unit as shown in FIG. 3. The optimization unit 104 may include: a model characteristic acquisition unit 4001, a data searching unit 4002 and an adjustment unit 4003.

The model characteristic acquisition unit 4001 is configured to acquire a model characteristic of the terminal, if the processing quality of the audio data does not reach the preset quality standard.

The preset quality standard may include at least one of a preset range of echo cancellation degree, a preset range of noise, and a preset range of gain volume. If the echo cancellation degree of the audio data is in the preset range of echo cancellation degree, and/or if the noise magnitude of the audio data after the noise reduction process is in the preset range of noise, and/or if the gain volume of the audio data is in the preset range of gain volume, the audio data processing quality reaches the preset quality standard. The model characteristic of the terminal may include but is not limited to any one or more kinds of model information of the terminal, Rom information of the terminal, vendor information of the terminal, core information of the terminal and sound card information of the terminal.

The data searching unit 4002 is configured to search a database for optimization data matching the model characteristic of the terminal, where the optimization data includes at least one of adjustment data of the echo cancellation algorithm, adjustment data of the noise reduction algorithm and adjustment data of the volume gain algorithm.

The database may store in advance at least one kind of the terminal model characteristic, as well as optimization data corresponding to the model characteristic of each terminal. The optimization data may include at least one of adjustment data of the echo cancellation algorithm, adjustment data of the noise reduction algorithm and adjustment data of the volume gain algorithm. The adjustment data of the echo cancellation algorithm may be a remote-end or near-end time delay, the adjustment data of the noise reduction algorithm may be a noise detecting threshold, and the adjustment data of the volume gain processing algorithm may be a gain ratio. The data searching unit 4002 may search a database for optimization data matching the model characteristic of the terminal.

The adjustment unit 4003 is configured to adjust the audio processing algorithm by utilizing the optimization data.

In practice, the adjustment unit 4003 utilizes the adjustment data of the echo cancellation algorithm to optimize the echo cancellation algorithm if the echo cancellation algorithm needs to be optimized, utilizes the adjustment data of the noise reduction algorithm to optimize the noise reduction algorithm if the noise reduction algorithm need to be optimized, and utilizes the adjustment data of the volume gain algorithm to optimize the volume gain algorithm if the volume gain algorithm need to be optimized.

It should be noted that, the adjustment process of the audio processing algorithm performed by the adjustment unit 4003 may be as follows: the corresponding data of the original audio processing algorithm are replaced by the adjustment data directly, or the corresponding data of the original audio processing algorithm are adjusted based on the adjustment data. The adjustment process of the adjustment unit 4003 may include the follows.

(1) In general, the problem of remote-end time delay or near-end time delay between the terminals making the audio call, will affect the echo cancellation process quality of the echo cancellation algorithm. The adjustment unit 4003 may adjust the remote-end time delay or near-end time delay of the audio data in the audio calls to optimize the echo cancellation algorithm.

(2) In general, the kernel of noise reduction algorithm is the noise detecting threshold. Noise is filtered by the noise reduction process based on the noise detecting threshold. The noise detecting threshold determines a degree of noise reduction process and a loss degree of a normal audio component. For example, if the noise detecting threshold is too small, the quality of the noise reduction process will be poor, and the effect of noise reduction will be insignificant; if the noise detecting threshold is too large, the effect of noise reduction will be improved, while the loss degree of the normal audio component will be increased. The adjustment unit 4003 may adjust the noise detecting threshold to optimize the noise reduction algorithm.

(3) In general, the kernel of the volume gain algorithm lies in a gain ratio, that is, a ratio of a gain volume to an original volume. The adjustment unit 4003 may adjust the gain ratio to optimize the volume gain algorithm.

According to an embodiment of the present disclosure, computer programs (including program code) which may execute the method for improving audio processing performance as shown in FIGS. 1 to 2, is operated on a general computing device such as a computer which includes processing components and storage components such as a central processing units (CPU), a random access memory (RAM) and a read only memory (ROM), to form the device for improving audio processing performance as shown in FIGS. 3 to 7, and to realize the method for improving audio processing performance according to the embodiments of the present disclosure. The computer program may be stored on a computer-readable recording medium, and be loaded in the computing device through the computer-readable recording medium and operated in the computing device.

In this embodiment of the disclosure, the audio processing algorithm may be utilized to process audio data of an audio call in a terminal, with which the audio quality of the audio call can be improved effectively. In addition, the processing quality of the audio data is analyzed based on the characteristics parameter of the audio data obtained during the audio processing, and the audio processing algorithm is optimized by utilizing optimization data matching the terminal if the processing quality of the audio data does not reach the preset quality standard, which constantly improves the audio processing, enhances the quality of audio processing and ensures the effect of the audio quality.

Figure 8:
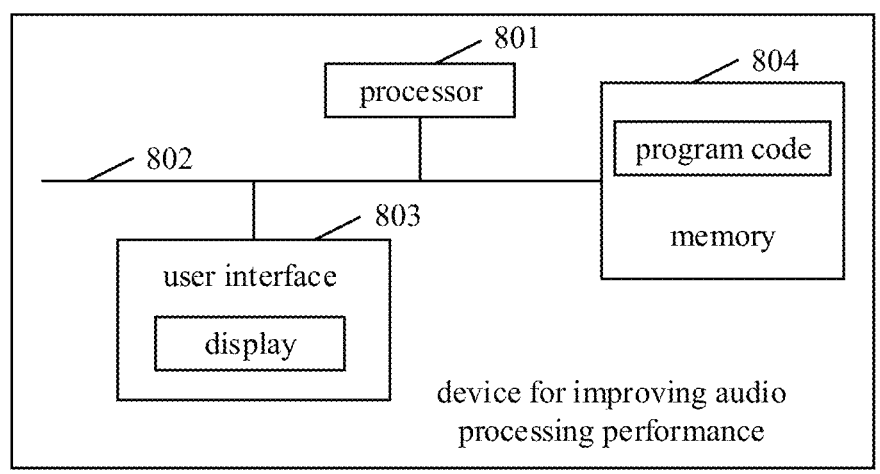
FIG. 8 is a schematic structure diagram of a device for improving audio processing performance according to another embodiment of the present disclosure.

Reference is made to FIG. 8, which is a schematic structure diagram of a device for improving audio processing performance according to another embodiment of the present disclosure. As shown in FIG. 8, the device for improving audio processing performance may include at least one processor 801, such as a CPU, at least one communication bus 802, a user interface 803 and a memory 804. The communication bus 802 is configured to realize the connection and communication between the components. The user interface 803 may include a display. Optionally the user interfaces 803 may further include a standard wired interface, a wireless interface. The memory 804 may be a high-speed Random Access Memory (RAM), or a non-volatile memory, for example at least one disk storage. The memory 804 optionally may also be at least one memory apparatus located remotely to the processor 801. The memory 804 stores a set of program codes, and the processor 801 calls program codes stored in the memory 804 to perform the following operations:

acquiring audio data of an audio call in a terminal;

processing audio data by utilizing an audio processing algorithm, and obtaining a characteristic parameter of the audio data, where the processing the audio data by utilizing an audio processing algorithm may include at least one of: performing an echo cancellation process on the audio data by utilizing the echo cancellation algorithm, performing a noise reduction process on the audio data by utilizing the noise reduction algorithm, and performing a volume gain process on the audio data by utilizing the volume gain processing algorithm; the echo parameter includes: an echo processing duration, an echo roundtrip loss and an echo roundtrip loss enhancement, the noise parameter includes: an input signal-to-noise ratio and an output signal-to-noise ratio, and the gain parameter includes: an input digital envelope of volume and an output digital envelope of volume;

analyzing the processing quality of the audio data based on the characteristic parameter of the audio data, where the analyzing a processing quality of the audio data based on the characteristic parameter of the audio data may include at least one of: analyzing the quality of the echo cancellation process based on the echo parameter of the audio data, analyzing the processing quality of the noise reduction process based on the noise parameter of the audio data, and analyzing the quality of the volume gain process based on the gain parameter; and optimizing the audio processing algorithm by utilizing optimization data matching the terminal if the processing quality of the audio data does not reach a preset quality standard, where the preset quality standard may include at least one of a preset range of echo cancellation degree, a preset range of noise, and a preset range of gain volume.

In an optional embodiment, the device for improving the audio processing performance may operate in a terminal and a server in a distributed manner. The device enable interactions between the terminal and the server via modules distributed in the terminal and the server, so as to achieve an operation for improving audio processing performance. The processor 801 calls program codes stored in the memory 804 to perform the following operations:

collecting by the terminal voice information in the audio call while the terminal is making the audio call;

converting by the terminal the voice information into the audio data;

processing by the terminal the audio data by utilizing an audio processing algorithm, and obtaining a characteristic parameter of the audio data;

reporting by the terminal the characteristic parameter of the audio data to a server;

receiving by the server the characteristic parameter of the audio data reported by the terminal;

analyzing by the server the processing quality of the audio data based on the characteristic parameter of the audio data;

obtaining a model characteristic of the terminal if the processing quality of the audio data does not reach the preset quality standard;

searching by the server a database for optimization data matching the model characteristic of the terminal;

returning by the server the optimization data to the terminal; and adjusting by the terminal the audio processing algorithm by utilizing the optimization data.

In an optional embodiment, the process that the processor 801 calls the program codes stored in the memory 804 to control the terminal to process the audio data by utilizing an audio processing algorithm and obtain a characteristic parameter of the audio data, which may include:

performing an echo cancellation process on the audio data by utilizing the echo cancellation algorithm; and/or, performing a noise reduction process on the audio data by utilizing the noise reduction algorithm; and calculating a noise parameter based on the noise reduction process; and/or, performing a volume gain process on the audio data by utilizing the volume gain processing algorithm, and counting a gain parameter based on the volume gain process.

In an optional embodiment, the process that the processor 801 calls the program codes stored in the memory 804 to control the server to analyze the processing quality of the audio data based on the characteristic parameter of the audio data by a server, which may include:

determining an echo cancellation degree of the audio data based on the echo processing duration, the echo roundtrip loss and the echo roundtrip loss enhancement; and/or, determining a noise magnitude of the audio data before the noise reduction process based on the input signal-to-noise ratio, and determining a noise magnitude of the audio data after the noise reduction process based on the output signal-to-noise ratio; and/or, determining original volume of the audio data based on the input digital envelope of volume, and determining the gain volume of the audio data based on the output digital envelope of volume.

In an optional embodiment, the processor 801 calls program codes stored in the memory 804 to perform the following operations.

If the echo cancellation degree of the audio data is in the preset range of echo cancellation degree, and/or if the noise magnitude of the audio data after the noise reduction process is in the preset range of noise, and/or if the gain volume of the audio data is in the preset range of gain volume, the audio data processing quality reaches the preset quality standard.

In an optional embodiment, the process that the processor 801 calls the program codes stored in the memory 804 to optimize the audio processing algorithm by utilizing optimization data matching the terminal if the processing quality of the audio data does not reach a preset quality standard, which may include:

obtaining a model characteristic of the terminal, if the processing quality of the audio data does not reach the preset quality standard;

searching a database for optimization data matching the model characteristic of the terminal, where the optimization data includes at least one of adjustment data of the echo cancellation algorithm, adjustment data of the noise reduction algorithm and adjustment data of the volume gain algorithm; and adjusting the audio processing algorithm by utilizing the optimization data.

Any reference in this specification to "an embodiment", "some embodiment", "example", "specific embodiment" and "some example", etc. means that a particular feature, structure, or characteristic described in connection with the embodiment is included in at least one embodiment. In the present specification, an illustrative representation of the above terms need not refer to the same embodiment or example. Furthermore, the particular features, structures, or characteristics may be combined in any suitable manner in one or more embodiments. In addition, those skilled in the art may combine the various embodiments or examples described herein and the features thereof without contradiction.

In addition, the term "first" or "second" is only for illustrative purpose, and is not intended to indicate or imply relative importance or implies the number of technical features. Thus, a feature that defined by "first" or "second" may include at least one feature either explicitly or implicitly. In the description of this disclosure, "multiple" means at least two, for example, two, three, etc., unless specifically limited otherwise.

Any process or method described in the flowchart or in other manners herein should be understood as representing modules, segments, or portions of code which include one or more executable instructions for implementing specific logical functions or steps in the process, and alternate implementations are included in the scope of the embodiments in which functions may be executed out of order from that shown or discussed, including substantially concurrently or in reverse order, depending on the functionality involved, as would be understood by those skilled in the art.

Logic and/or steps described in the flowchart or other manners herein, for example, may be provided by an ordered listing of executable instructions that can be embodied in any computer-readable medium for use by or in connection with an instruction execution system, apparatus, or device (such as a computer-based system, processor-containing system, or other system that can fetch the instructions from the instruction execution system, apparatus, or device and execute the instructions). In view of the disclosure herein, the computer-readable medium may be any medium that can contain, store, communicate, propagate, or transport the program for use by or in connection with the instruction execution system, apparatus, or device. More specific examples (a non-exhaustive list) of the computer-readable medium would include the following: an electrical connection part (electrical device) having one or multiple routing, a portable computer diskette, a random access memory (RAM), a read-only memory (ROM), an erasable programmable read-only memory (EPROM or Flash memory), and a compact disc read-only memory (CD-ROM). In addition, the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It is to be understood that the present disclosure can be implemented in various forms of hardware, software, firmware, or a combination thereof. In the above embodiments, multiple steps or method may be implemented in software or firmware that is stored in a memory and that is executed by a suitable instruction execution system. For example, if implemented in hardware as the same as in another embodiment, it may be implemented with any or a combination of the following technologies which are all well known in the art: a discrete logic circuit having logic gates for implementing logic functions upon data signals, an application specific integrated circuit having appropriate combinational logic gates, a programmable gate array (PGA), a field programmable gate array (FPGA), etc.

Those skilled in the art will appreciate that all or some of the steps in an embodiment method may be achieved by a program instructing relevant hardware, where the program may be stored in a computer readable storage medium, and may include one of the steps of the method embodiment or a combination thereof when executed.

In addition, according to embodiments of the present disclosure, the function modules may be integrated in one processing module, or each of the function modules is physically present, or two or more function modules may be integrated into one module. The above integrated module can be realized in the form of hardware or software function module. The integrated modules may also be stored in a computer-readable storage medium if implemented in the form of software function modules and sold or used as standalone products.

The above-mentioned storage medium may include but is not limited to a read-only memory, a magnetic or optical disk, etc. it will be appreciated that the above described embodiments are only exemplification of the various aspects of the present disclosure and are not to be construed as the limit of the present disclosure. Those skilled in the art will appreciate that many variations and alterations to the above embodiments are within the scope of the disclosure.

The invention claimed is:

1. A method for improving audio processing performance, comprising:
    using a hardware processor on a terminal:
        acquiring audio data of an audio call in the terminal;
        performing first processing on the audio data by utilizing an audio processing algorithm and obtaining a characteristic parameter of the audio data;
        sending, to a server, a report including the characteristic parameter; and
        in response to a processing quality of the audio data not having reached a preset quality standard, the processing quality of the audio data determined by analyzing the processing quality of the audio data based on the characteristic parameter of the audio data:
            receiving from the server, a request for a model characteristic for the terminal, the model characteristic comprising information on a hardware component of the terminal;
            receiving optimization data from the server, the optimization data matching the model characteristic, the optimization data matching the model characteristic obtained by searching a database for the optimization data matching the model characteristic;
            optimizing the audio processing algorithm by utilizing optimization data matching the terminal; and
            performing second processing on the audio data using the audio processing algorithm after optimizing the audio processing algorithm,
    wherein the audio processing algorithm comprises at least one of an echo cancellation algorithm, a noise reduction algorithm and a volume processing gain algorithm;
    wherein the characteristic parameter of the audio data comprises at least one of an echo parameter, a noise parameter and a gain parameter;
    wherein the echo parameter comprises an echo processing duration, an echo roundtrip loss and an echo roundtrip loss enhancement;
    wherein the noise parameter comprises an input signal-to-noise ratio and an output signal-to-noise ratio;
    wherein the gain parameter comprises an input digital envelope of volume and an output digital envelope of volume.

2. The method according to claim 1, wherein the acquiring audio data of an audio call in a terminal comprises:
    collecting voice information in the audio call during the audio call; and
    converting the voice information into the audio data.

3. The method according to claim 1, wherein the first processing the audio data by utilizing the audio processing algorithm and obtaining a characteristic parameter of the audio data comprises any one or a combination of:
    performing an echo cancellation process on the audio data by utilizing the echo cancellation algorithm, and recording an echo parameter obtained during the echo cancellation process;
    performing a noise reduction process on the audio data by utilizing the noise reduction algorithm, and calculating a noise parameter based on the noise reduction process; and
    performing a volume gain process on the audio data by utilizing the volume gain processing algorithm, and counting a gain parameter based on the volume gain process.

4. The method according to claim 3, wherein the analyzing a processing quality of the audio data based on the characteristic parameter of the audio data comprises any one or a combination of:
    determining an echo cancellation degree of the audio data based on the echo processing duration, the echo roundtrip loss and the echo roundtrip loss enhancement;
    determining a noise magnitude of the audio data before the noise reduction process based on the input signal-to-noise ratio, and determining a noise magnitude of the audio data after the noise reduction process based on the output signal-to-noise ratio; and
    determining an original volume of the audio data based on the input digital envelope, and determining a gain volume of the audio data based on the output digital envelope.

5. The method according to claim 4, wherein:
    the preset quality standard comprises at least one of a preset range of echo cancellation degree, a preset range of noise, and a preset range of gain volume; and
    the audio data processing quality reaches the preset quality standard if at least one of the following conditions is met: the echo cancellation degree of the audio data is in the preset range of echo cancellation degree, the noise magnitude of the audio data after the noise reduction process is in the preset range of noise, and the gain volume of the audio data is in the preset range of gain volume.

6. The method according to claim 1, where the hardware component of the terminal includes a core of the terminal, a sound card of the terminal, or both.

7. A device for improving audio processing performance, comprising at least one processor and a memory connected to the at least one processor, wherein the at least one processor is configured to execute program codes stored in the memory to perform the following operations:
    acquiring audio data of an audio call in a terminal;
    performing first processing on the audio data by utilizing an audio processing algorithm, and obtaining a characteristic parameter of the audio data;
    sending, to a server, a report including the characteristic parameter; and
    in response to a processing quality of the audio data not having reached a preset quality standard, the processing quality of the audio data determined by analyzing the processing quality of the audio data based on the characteristic parameter of the audio data:
        receiving from the server, a request for a model characteristic for the terminal, the model characteristic comprising information on a hardware component of the terminal;
        receiving optimization data from the server, the optimization data matching the model characteristic, the optimization data matching the model characteristic obtained by searching a database for the optimization data matching the model characteristic;
        optimizing the audio processing algorithm by utilizing optimization data matching the terminal and;
        performing second processing on the audio data using the audio processing algorithm after optimizing the audio processing algorithm,
    wherein the audio processing algorithm comprises at least one of an echo cancellation algorithm, a noise reduction algorithm and a volume gain processing algorithm;
    wherein the characteristic parameter of the audio data comprises at least one of an echo parameter, a noise parameter and a gain parameter;

wherein the echo parameter comprises an echo processing duration, an echo roundtrip loss and an echo roundtrip loss enhancement;

wherein the noise parameter comprises an input signal-to-noise ratio and an output signal-to-noise ratio; and wherein the gain parameter comprises an input digital envelope of volume and an output digital envelope of volume.

8. The device according to claim 7, wherein the operations further comprise:

collecting voice information in the audio call during the audio call; and converting the voice information into the audio data.

9. The device according to claim 7, wherein the operations further comprise any one or a combination of:

performing an echo cancellation process on the audio data by utilizing the echo cancellation algorithm, and recording an echo parameter obtained during the echo cancellation process;

performing a noise reduction process on the audio data by utilizing the noise reduction algorithm, and calculating a noise parameter based on the noise reduction process; and performing a volume gain process on the audio data by utilizing the volume gain processing algorithm, and counting a gain parameter based on the volume gain process.

10. The device according to claim 9, wherein the operations further comprise any one or a combination of:

determining an echo cancellation degree of the audio data based on the echo processing duration, the echo roundtrip loss and the echo roundtrip loss enhancement;

determining a noise magnitude of the audio data before the noise reduction process based on the input signal-to-noise ratio, and determining a noise magnitude of the audio data after the noise reduction process based on the output signal-to-noise ratio; and determining an original volume of the audio data based on the input digital envelope, and determining a gain volume of the audio data based on the output digital envelope.

11. The device according to claim 10, wherein:

the preset quality standard comprises at least one of a preset range of echo cancellation degree, a preset range of noise, and a preset range of gain volume; and the audio data processing quality reaches the preset quality standard if at least one of the following conditions is met: the echo cancellation degree of the audio data is in the preset range of echo cancellation degree, the noise magnitude of the audio data after the noise reduction process is in the preset range of noise, and the gain volume of the audio data is in the preset range of gain volume.

12. The device according to claim 7, where the hardware component of the terminal includes a core of the terminal, a sound card of the terminal, or both.

13. A non-transitory computer storage medium comprising:

computer executable instructions that, when executed by a processor, cause the processor to perform a method for improving audio processing performance, wherein the method comprises:

acquiring audio data of an audio call in a terminal;

performing first processing on the audio data by utilizing an audio processing algorithm, and obtaining a characteristic parameter of the audio data;

sending, to a server, a report including the characteristic parameter; and in response to a processing quality of the audio data not having reached a preset quality standard, the processing quality of the audio data determined by analyzing the processing quality of the audio data based on the characteristic parameter of the audio data:

receiving from the server, a request for a model characteristic for the terminal, the model characteristic comprising information on a hardware component of the terminal;

receiving optimization data from the server, the optimization data matching the model characteristic, the optimization data matching the model characteristic obtained by searching a database for the optimization data matching the model characteristic;

optimizing the audio processing algorithm by utilizing optimization data matching the terminal; and performing second processing on the audio data using the audio processing algorithm after optimizing the audio processing algorithm, wherein the audio processing algorithm comprises at least one of an echo cancellation algorithm, a noise reduction algorithm and a volume gain processing algorithm;

wherein the characteristic parameter of the audio data comprises at least one of an echo parameter, a noise parameter and a gain parameter;

wherein the echo parameter comprises an echo processing duration, an echo roundtrip loss and an echo roundtrip loss enhancement;

wherein the noise parameter comprises an input signal-to-noise ratio and an output signal-to-noise ratio; and wherein the gain parameter comprises an input digital envelope of volume and an output digital envelope of volume.

14. The non-transitory computer storage medium according to claim 13, wherein the first processing the audio data by utilizing the audio processing algorithm and obtaining a characteristic parameter of the audio data comprises any one or a combination of:

performing an echo cancellation process on the audio data by utilizing the echo cancellation algorithm, and recording an echo parameter obtained during the echo cancellation process;

performing a noise reduction process on the audio data by utilizing the noise reduction algorithm, and calculating a noise parameter based on the noise reduction process; and performing a volume gain process on the audio data by utilizing the volume gain processing algorithm, and counting a gain parameter based on the volume gain process.

15. The non-transitory computer storage medium according to claim 14, wherein the analyzing a processing quality of the audio data based on the characteristic parameter of the audio data comprises any one or a combination of:

determining an echo cancellation degree of the audio data based on the echo processing duration, the echo roundtrip loss and the echo roundtrip loss enhancement;

determining a noise magnitude of the audio data before the noise reduction process based on the input signal-to-noise ratio, and determining a noise magnitude of the audio data after the noise reduction process based on the output signal-to-noise ratio; and determining an original volume of the audio data based on the input digital envelope, and determining a gain volume of the audio data based on the output digital envelope.

16. The non-transitory computer storage medium according to claim 15, wherein:
the preset quality standard comprises at least one of a preset range of echo cancellation degree, a preset range of noise, and a preset range of gain volume; and
the audio data processing quality reaches the preset quality standard if at least one of the following conditions is met: the echo cancellation degree of the audio data is in the preset range of echo cancellation degree, the noise magnitude of the audio data after the noise reduction process is in the preset range of noise, and the gain volume of the audio data is in the preset range of gain volume.

17. The non-transitory computer storage medium according to 13, where the hardware component of the terminal includes a core of the terminal, a sound card of the terminal, or both.

\* \* \* \* \*